United States Patent Office 3,641,104
Patented Feb. 8, 1972

3,641,104
CYANO SUBSTITUTED PERFLUOROVINYL ETHERS
Daniel Gustav Anderson, Parkersburg, W. Va., Edward Karcher Gladding, Wilmington, Del., and Raymond Sullivan, Altadena, Calif., assignors to E. I. du Pont de Nemours and Company, Wilmington, Del.
No Drawing. Continuation-in-part of application Ser. No. 527,725, Feb. 16, 1966. This application Sept. 30, 1968, Ser. No. 763,954
Int. Cl. C07c *121/30*
U.S. Cl. 260—465.6       2 Claims

ABSTRACT OF THE DISCLOSURE

Substituted perfluorovinyl ethers having the formula $CF_2=CF-O-(CF_2)_n-CN$ where $n$ is from 2 to 12, preferably 2 to 4. Specific utilities include employment as cure-site comonomers in copolymers with other ethylenically unsaturated monomers.

CROSS-REFERENCE TO RELATED APPLICATIONS

This application is a continuation-in-part of application Ser. No. 527,725, filed Feb. 16, 1966, now abandoned.

FIELD OF THE INVENTION

This invention relates to fluorinated perfluorovinyl ethers and the preparation thereof.

BACKGROUND OF THE INVENTION

Polymers prepared from certain fluorinated monomers have become widely known for their ability to resist environmental attack. U.S. Pat. No. 3,235,537, issued Feb. 15, 1966, to Albin and Gallagher, discloses a process wherein perfluoroalkyl perfluorovinyl ethers are employed as comonomers with vinylidene fluoride and other ethylenically saturated monomers. Ether comonomers such as those disclosed by Albin et al. do not participate in cross-linking by conventional routes which depend upon dehydrofluorination. This is particularly disadvantageous when the copolymers are completely fluorinated (e.g., containing no vinylidene fluoride). Thus, there has been a need for cure-site monomers capable of cross-linking highly fluorinated polymer systems.

BRIEF STATEMENT OF THE INVENTION

According to this invention there are provided substituted perfluorovinyl ethers having the formula $$CF_2=CF-O-(CF_2)_n-X$$

wherein —X can be —COF, —COOH, —COOR₁, —COOM, —CONR₂R₃, or —CN radicals wherein $n$ is a while number from 2 to 12, $R_1$ is an alkyl radical of from 1 to 10 carbons and $R_2$ and $R_3$ are $R_1$, hydrogen or combinations thereof; and M is alkali metal. The substituted perfluorovinyl ethers of the invention can serve as cure-site monomers in fluorinated copolymer systems, even where the copolymer is wholly perfluorinated; and are additionally useful as chemical intermediates because rich in fluorine and reactive at each end of the molecule.

A novel process of this invention whereby compounds of the formula $CF_2'=CF-O-(CF_2)_n-COOM$ may be prepared is the pyrolysis under substantially anhydrous conditions of compounds of the formula

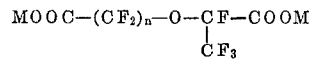

wherein $n$ is 2 to 12 (preferably 2 to 4) and —M is alkali metal (preferably Na, K or Cs), said pyrolysis conducted at a temperature of at least about 175° C. but below about 200° C. During this pyrolysis some —COF terminated ether is also produced, the proportion thereof being greater at the higher temperatures.

DETAILED DESCRIPTION OF THE INVENTION

The first step in preparing the novel perfluorovinyl ethers of this invention follows the disclosure of U.S. Pat. No. 3,114,778. The preferred method involves the reaction of a perfluoro diacid fluoride [$OFC-(CF_2)_x-CFO$ wherein $x$ is from 1 to about 11] with hexafluoropropylene oxide in the presence of an alkali metal fluoride such as CsF and a polar solvent such as diethyleneglycol dimethyl ether. The products of the reaction are perfluoro [2-methyl-3-oxa-alkane] dioylfluorides. In the next step of the process the dioyl fluorides are esterfied with alcohols, preferably methanol to the diester form. The diester is then saponified with an anhydrous methanol solution of an alkali metal hydroxide, such as KOH, NaOH or CsOH, to provide the dimonovalent metal salt. Alternatively, the dioyl fluoride can be converted to a diacid by reaction with water with subsequent neutralization with an aqueous solution of the aforementioned hydroxides. The preferred salt is the dipotassium salt. When the di-metal salt is pyrolyzed and the reaction products are isolated, it is surprising to obtain a monometal salt of a new perfluorovinyl ether. These salts are capable of reaction with aqueous solutions of strong acids to form the novel acids. The latter may be esterified with alcohols to form the novel esters and amidated with amines to form the novel amides. When the amides are formed by treatment with ammonia or $NH_3$, subsequent reaction with $P_2O_5$ leads to the formation of novel nitriles, all containing the perfluorovinyl group. In addition, the substituted perfluorovinyl ethers of the invention where —X is —COF or —COOH can be converted into alkaline earth metal ionomers such as that of magnesium, employing conventional reaction techniques.

Compounds within the formula $$CF_2=CF-O-(CF_2)_n-X$$

as defined above can be used for polymerization with a variety of ethylenically unsaturated monomers, such as alpha-olefins, vinyl halides, vinyl ethers, vinyl esters, and the like. Preferred comonomers are tetrafluoroethylene, hexafluoropropylene, chlorotrifluoroethylene, 1,1,1,3,3-pentafluoropropylene, 1,1,1,2,3-pentafluoropropylene, and $CF_2=CF-O-R_f$ where $R_f$ is perfluoroalkyl of from 1 to 3 carbons.

In preparing copolymers containing the new monomers of this invention, a preferred method of polymerization employs aqueous media and free-radical initiators at slightly elevated temperatures, e.g., 40° C., and pressures in the order of 120 p.s.i.g. Alternatively, bulk or solution processes can be used with appropriate free-radical catalysts. Those skilled in the art will recognize modificaton of polymerization conditions to suit the monomers employed, e.g., one would normally not employ aqueous systems for monomers having water-reactive end groups unless such a reaction were desired. The ester form, particularly the methyl ester, is preferred for copolymerization with other ethylenically unsaturated monomers, but any alkyl ester group containing up to about 10 carbon atoms is satisfactory, with those containing up to three carbon atoms being preferred. Preferably, the copolymers contain the substituted perfluorovinyl ether in the amount of about 0.5 to 5 mole percent. Additional details of copolymer preparations are set out in copending application Ser. No. 763,953, filed Sept. 30, 1968.

The invention will now be described with reference to the following examples of specific embodiments thereof wherein parts and percentages are by weight unless otherwise specified.

EXAMPLE 1

(A) Preparation of perfluoro[2-methyl 3-oxaoctane] dioyl fluoride

A dry glass reaction vessel fitted with a mechanical stirrer and a gas inlet is charged with 427 g. of perfluoroglutaryl fluoride [OFC—$(CF_2)_3$—CFO], 150 ml. of diethylene glycol dimethyl ether and 30 g. of cesium fluoride. The vessel and contents are cooled to —30° C. in a "Dry Ice" bath and evacuated to about 25 mm. pressure. The mixture is stirred vigorously and 335 g. of hexafluoropropylene epoxide is condensed into the flask. The temperature is gradually raised to maintain pressure between 0 and 5 p.s.i.g. until at room temperature no excess pressure remains in the flask. Distillation of the reaction mixture at 1 atmosphere pressure in a nitrogen atmosphere yields perfluoro-2-methyl-3-oxa-octanedioyl fluoride

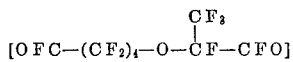

B.P. 108° C. in 75% yield based on the perfluoroglutaryl fluoride.

(B) Preparation of dipotassium perfluoro-2-methyl-3-oxaoctanedioate

Into an open polyethylene bottle is placed 500 g. of perfluoro-2-methyl-3-oxaoctanedioyl fluoride. One hundred ml. of water is added slowly to form perfluoro-2-methyl-3-oxaoctanedioic acid. The acidic solution is warmed to 50–60° C. under vacuum for several hours to remove HF. The acid solution is treated with aqueous potassium hydroxide until a pH of 7–8 is reached. The solution is then dried at 100° C. for 2–3 days under vacuum with occasional pulverizing until a fine, dry powder is obtained.

(C) Preparation of potassium perfluoro-6-oxa-7-octeneoate

A 500 ml. glass, round-bottom flask is equipped for stirring, heating and vacuum operation and fitted with an outlet leading to a trap packed in "Dry Ice." Into the flask is charged from about 50 to 75 g. of dipotassium perfluoro-2-methyl-3-oxaoctanedioate. The flask and contents are held at 0.5 mm. Hg and pyrolyzed with intermittent agitation for 3 to 4 hours at temperatures between 175° and 210° C. During this operation, part of the contents remain in the flask and part distilled over to be condensed in the trap packed in "Dry Ice." The solid residue remaining in the flask is predominantly potassium perfluoro-6-oxa-7-octeneoate [$CF_2$=CF—O—$(CF_2)_4$—COOK], as shown by its conversion to the ester in the following examples and by a carboxylate absorption at 5.9µ and a vinyl ether absorption at 5.45µ in the infrared. Maintaining the pyrolysis temperature below about 200° C. favors production of the —COOK terminated vinyl ether.

(D) Preparation of perfluoro-6-oxa-7-octenoyl fluoride

A total of 525 g. of dipotassium perfluoro-2-methyl-3-oxaoctanedioate is pyrolyzed as described in Part C above. The accumulated condensates weighing 31 g. which are recovered in the trap packed in "Dry Ice," are distilled under a dry nitrogen atmosphere at atmospheric pressure to yield 7.3 g. of perfluoro-6-oxa-7-octenoyl fluoride [$CF_2$=CF—O—$(CF_2)_4$—COF], B.P. 90–91° C. Infrared and nuclear magnetic resonance spectra are consistent with the structure assigned.

The infrared spectrum shows the vinyl ether absorption at 5.45µ and the carbonyl group appears at 5.3µ. $F^{19}$ NMR shows the presence of carbonyl fluorine.

EXAMPLE 2

Preparation of perfluoro-6-oxa7-octenoic acid

The flask residue containing potassium perfluoro-6-oxa-7-octeneoate obtained from the pyrolysis described in Example 1 is taken up in 10–20 ml. of $H_2O$ and concentrated mineral acid is added until separation into two layers occurs. The bottom layer is predominantly perfluoro-6-oxa-7-octenoic acid [$CF_2$=CF—O—$(CF_2)_4$—COOH] as shown by the preparation of the methyl ester of Example 3 and by the infrared absorption of the crude dried acid at 3.0 to 3.4µ and 5.65µ.

EXAMPLE 3

Preparation of methyl perfluoro-6-oxa-7-octenoate

To the perfluoro-6-oxa-7-octenoic acid, prepared as described in Example 2, is added concentrated $H_2SO_4$ until no further precipitate forms and the solution is filtered. Any water separating out is removed and 20–30 ml. of methanol is added and the solution filtered again and then refluxed for approximately three hours. Water is separated from the cooled solution, and the dark, ester layer is washed several times with water, dried over anhydrous magnesium sulfate and distilled on an 18-inch spinning band column to yield methyl perfluoro-6-oxa-7-octenoate, B.P. 146° C. at atmospheric pressure. In a typical run starting with 250 g. of dipotassium perfluoro-2-methyl-3-oxaoctanedioate and pyrolyzed in 50–75 g. batches and following the steps of Examples 1 and 2, there is recovered 64 g. of methyl perfluoro-6-oxa-7-octenoate

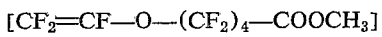

Infrared and nuclear magnetic resonance spectra are consistent with the structure assigned. Infrared analysis shows a vinyl ether absorption at 5.45µ and the ester carbonyl at 5.6µ. The $F^{19}$ nuclear magnetic resonance spectrum shows vinylic fluorines at 117, 125, and 138 p.p.m., $CF_2O$ at 87 p.p.m. and $CF_2$ groups at 120, 125, 127 p.p.m., referred to $CFCl_3$. Proton resonance shows the methyl ester at τ 6.0.

EXAMPLE 4

(A) Preparation of methyl perfluoro-5-oxa-6-heptenoate

The procedure of Part A of Example 1 is followed except perfluorosuccinyl fluoride [OFC—$(CF_2)_2$—CFO] is used in place of perfluoroglutaryl fluoride, and the product recovered is perfluoro[2-methyl-3-oxaheptane]dioyl fluoride

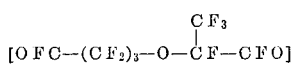

The dipotassium salt is prepared in accordance with the procedure of Example 1, Part B. The dipotassium salt is pyrolyzed as described in Example 1, Part C, and methyl perfluoro-5-oxa-6-heptenoate

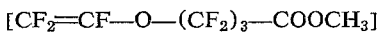

is prepared from the flask residue in accordance with the procedures of Example 3, B.P. 61° C.–62° C. at 51 mm. Hg.

Infrared analysis shows the characteristic vinyl ether and ester absorption at 5.45µ and 5.6µ, respectively. $F^{19}$ NMR shows the vinylic fluorines at 117, 125, 142 p.p.m., the $CF_2O$ at 87 p.p.m. and $CF_2$ groups at 121 and 128 p.p.m., referred to $CFCl_3$.

(B) Preparation of perfluoro-5-oxa-6-heptenoyl fluoride

The condensate recovered in the "Dry Ice" trap from the pyrolysis described above is worked up in accordance with the procedures of Part D of Example 1. Perfluoro-5-oxa-6-heptenoyl fluoride

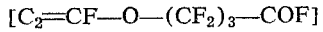

B.P. 70° C. at atmospheric pressure is recovered.

Infrared analysis reveals the vinyl ether and carbonyl fluoride groups at 5.45μ and 5.3μ, respectively, and F$^{19}$ NMR confirms their presence with characteristic absorptions.

EXAMPLE 5

Preparation of perfluoro-5-oxa-6-hepteneamide

To glass reaction vessel fitted with a stirrer and gas inlet is added 18.3 g. of methyl perfluoro-5-oxa-6-heptenoate and 35 ml. of anhydrous diethyl ether as solvent. The flask is cooled to −35° C. and evacuated. One gram of anhydrous ammonia is added. After several minutes the flask is warmed to room temperature, the solvent is removed under reduced pressure. The solid residue is crystallized from benzene to give 13 g. of perfluoro-5-oxa-6-hepteneamide [CF$_2$=CF—O—(CF$_2$)$_3$—CONH$_2$], M.P. 64.5–65.5° C.

Infrared analysis shows the carbonyl absorption shifted to 5.8–5.9μ, characteristic of fluoro alkyl amides. The N—H absorption occurred at 2.9–3.1μ and the vinyl ether at 5.45μ.

EXAMPLE 6

Preparation of N,N-diethylperfluoro-5-oxa-6-hepteneamide

To a dry flask in an ice bath is added 5 ml. of anhydrous acetonitrile, 1.1 g. of perfluoro[5-oxa-6-hepten]oyl fluoride and 0.2 g. of diethyl amine. After 15 minutes the crude N,N-diethylperfluoro[5-oxa-6-hepten]amide [CF$_2$=CF—O—(CF$_2$)$_3$—CON(C$_2$H$_5$)$_2$] is washed with water and with dilute NaHCO$_3$ solution and dried over MgSO$_4$ to give a 75% yield of solid product. The infrared and nuclear magnetic resonance spectra are consistent with the assigned structure.

Infrared analysis shows the ethyl groups at 3.3μ and the carbonyl absorption occurs at 5.9–6.0μ.

EXAMPLE 7

Preparation of perfluoro-5-oxa-6-heptenenitrile

A dry glass reaction vessel connected in series to a steam heated condenser and a trap cooled by "Dry Ice" is charged with a mixture of 12 g. of perfluoro[5-oxa-6-hepten]amide and 8 g. of P$_2$O$_5$. The vessel and contents are heated to 160° C. for 4 hours. The condensate from the trap is distilled and perfluoro-5-oxa-6-heptenenitrile [CF$_2$=CF—O—(CF$_2$)$_3$—CN], B.P. 65° C. at atmospheric pressure is recovered in 85% yield. Infrared and nuclear magnetic resonance spectra are consistent with the assigned structure.

The infrared spectrum shows the nitrile band at 6.4μ and the vinyl ether at 5.45μ. The three CF$_2$ groups absorb at 85, 124 and 127 p.p.m. in the F$^{19}$ NMR spectrum.

EXAMPLE 8

Preparation of perfluoro-4-oxa-5-hexenoyl fluoride 40 grams (0.13 mole) of perfluoro-2-methyl-3-oxaadipoyl fluoride and 12 g. (0.39 mole) of anhydrous methanol are stirred at −78° C. under anhydrous conditions to prepare the dimethyl ester of the adipoyl fluoride. Excess methanol and hydrogen fluoride are removed from the mixture by evacuation at 2 mm. Hg at room temperature. The resulting solution is titrated to the phenolphthalein end point with 5 N-methanolic potassium hydroxide solution (52 ml., 0.26 mole). The excess methanol is removed by vacuum distillation at 2 mm. Hg at 100° C. to give 40.0 g. (0.11 mole) of the dipotassium salt of perfluoro-2-methyl-3-oxaadipic acid. This salt is pyrolyzed in a stainless steel pot at 260° C. and after removal of carbon dioxide by evaporation amounts to 12.8 g. A gas chromatogram of the product mixture shows 14 peaks, the two major peaks being about 70% of the total. The product is passed through a preparative scale gas chromatography unit and the two major components are isolated from each other and assigned the structures CF$_2$=CF—O—CF=CF$_2$ and $$CF_2=CF-O-(CF_2)_2-COF$$

based on their respective infrared and nuclear magnetic resonance spectra.

In accordance with the foregoing examples of preparations of ethers of the formula CF$_2$=CF—O—(CF$_2$)$_n$—X, to vary the size of $n$ from about 2 to 12, one should vary the perfluorodioyl fluoride employed in Example 1, Part A from perfluoromalonyl fluoride to $$OCF-(CF_2)_{11}CFO$$

The novel compounds constitute a new class of chemical intermediates, rich in fluorine substituents. Both ends of the molecule are reactive which permits the synthesis of a variety of new compounds which might otherwise be difficult to obtain. The compound $$CF_2=CF-O-CF_2-CF_2-COF$$

can be pyrolyzed to CF$_2$=CF—O—CF=CF$_2$. Certain novel ethers of this invention can be used to alter and improve the properties of polymers made therefrom with respect to resistance to heat, solvents and low temperatures. The novel copolymers of this invention are vulcanizable and they can be shaped and molded into a wide variety of useful products according to methods well known in the art.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:
1. Compounds of the formula

$$CF_2=CF-O-(CF_2)_n-CN$$

where $n$ is a whole number from 2 to 12.

2. Compounds as defined in claim 1 where $n$ is a whole number from 2 to 4.

References Cited

UNITED STATES PATENTS 2,280,790    4/1942    Bruson _____ 260—465.6
2,713,593    7/1955    Brice et al. _____ 260—465.6 X JOSEPH PAUL BRUST, Primary Examiner U.S. Cl. X.R.

260—80.3 E, 85.5 A, 86.3 R, 86.7 R, 87.5 A, 88.1 PE, 404, 408, 484 R, 484 P, 535 P, 535 H, 544 F, 561 N, 614 F